United States Patent Office 3,660,529
Patented May 2, 1972

3,660,529
REINFORCEMENT OF PLASTICS WITH SUSPENSION EMULSION INTERPOLYMERS
Frank O. Groch, Irvington, N.Y., assignor to Stauffer Chemical Company, New York, N.Y.
No Drawing. Filed Feb. 16, 1970, Ser. No. 11,851
Int. Cl. C08f 37/18
U.S. Cl. 260—876 R
25 Claims

ABSTRACT OF THE DISCLOSURE

Rigid plastics are reinforced by admixture with a plurality of rubber-containing interpolymer particles which are prepared by the suspension polymerization of a vinyl monomer, such as vinyl chloride, in the presence of an aqueous emulsion of particles comprising a hard inner core of a polymer having a glass transition temperature (Tg) above about 25° C. and an outer layer comprising a crosslinkable rubber having a Tg of less than about 25° C. The resulting reinforced plastics display excellent physical properties.

RELATED APPLICATION

Portions of the subject matter of this application which are disclosed but not claimed herein are claimed in application Ser. No. 11,852, filed Feb. 16, 1970.

BACKGROUND OF THE INVENTION

It is a common practice to reinforce such rigid plastics as polyvinyl chloride, polymethyl methacrylate, polystyrene, styrene-acrylonitrile copolymers and the like with particles of rubber polymers such as polybutadiene and the polyacrylates. The addition of rubber to these common plastics improves their impact strength, that is their ability to withstand a rapidly applied shock. While the addition of rubber improves the impact strength of these plastics, their other physical properties such as tensile strength, clarity, heat distortion temperature, hardness and aging stability are, however, adversely affected by the rubber. In most cases, the addition of the larger amounts of rubber which would produce the maximum amount of impact strength results in a plastic that is to soft for many uses. The common commercial products, then, are a comprise between the desire to increase impact strength while being able to maintain their other necessary physical properties.

Many references exist which describe how to prepare rubber-reinforced plastics. The rubbery particles can be dispersed in the rigid phase by mill blending or latex blending, or, by polymerizing the hard polymer in the presence of the rubber. The rubber has been shown to exist in the hard polymer matrices as discrete particles of about 0.1 to 5 microns in diameter. The mechanism of rubber reinforcement is not completely understood but the rubber particles are believed to act either as deflectors of a growing crack or as stress concentrators from which stress-whitening, i.e., cold-drawing, can be initiated. By either of these methods the energy of a growing crack in the continuous, hard plastic phase may be safely dissipated.

These theories indicate that only the outer portion of the rubber particles function in rubber reinforcement. It has generally been found that for a given amount of rubber there is an optimum rubber particle size range which for most plastics appears to be on the order of about 0.25 to 2 microns. The particles should not be smaller than the radius of an incipient crack, nor should they be so large that there are too few of them in a given rubber load to encounter and check the cracks. In many cases the efficiency of rubber reinforcement has been improved by grafting, i.e., chemically bonding, a hard polymeric coating around the rubber core. The hard material is usually more compatible, i.e., soluble, in the continuous phase and the graft is believed to function by improving the adhesion between the rubber particles and the continuous phase.

U.S. patent application No. 876,928, filed Nov. 14, 1969 describes the preparation, by means of seeded emulsion polymerization procedures, of multilayered or so-called "sandwich" polymeric particles having a hard inner core and a rubbery outer layer. The latter disclosure notes that such sandwich particles can, per se, be blended with rigid plastics or they can, first, have an additional layer of a hard polymer grafted thereon whereupon they may then be blended with rigid plastics. In either case, the thus modified rigid plastics display substantially improved impact strength without deleteriously affecting any other physical properties, such as tensile strength, as has been known to occur when conventionally prepared rubber particles are employed as impact resistance additives for rigid plastics.

However, one of the disadvantages of the latter multilayered or sandwich particles relates to the fact that their outer rubber layer is applied by means of an emulsion polymerization procedure which results in the final particles having a relatively small particle size which, in commercial practice, usually necessitates their isolation by means of a costly, time consuming spray-drying technique or by coagulation with a brine solution which is also time consuming and which may introduce ionic impurities into the polymer. Needless to say, it would be highly desirable to find some means of eliminating such inefficient product isolation and drying procedures.

Thus, it is the prime object of this invention to improve upon the multilayered sandwich particles resulting from the process of the above identified copending patent application. More particularly, it is the object of this invention to prepare such particles in a form where they are substantially devoid of ionic impurities and which more readily facilitates their isolation and handling without in any way detracting from the properties required for their successful utilization as high impact plastics or as modifiers for the reinforcement of rigid plastics.

TECHNICAL DISCLOSURE OF THE INVENTION

In brief, the novel process of this invention comprises the suspension polymerization of a vinyl monomer, such as vinyl chloride, in the presence of an aqueous emulsion of sandwich polymer particles having a hard inner core of an emulsion polymer and a rubber emulsion polymer outer core. The latter process yields particles of what may be termed as "suspension-emulsion interpolymer" (SEI) particles in which microscopic examination reveals that the polymer of the suspension polymerized vinyl monomer such, for example, as polyvinyl chloride, surrounds and/or is intimately dispersed throughout the mass of the rubber emulsion polymer. This phenomenon apparently results from the fact that the vinyl monomer, e.g., vinyl chloride, which is used for the final suspension polymerization step, has partially swollen this rubber emulsion polymer outer layer of the sandwich particles prior to polymerizing. The resulting particles, having been prepared by means of a suspension process, are in the form of agglomerates which have a particle size that is substantially greater than that of the original sandwich polymer particles utilized in their preparation. As a result, these SEI particles are far easier to dry and to handle than are the sandwich polymer particles utilized in their preparation. In addition, they are substantially devoid of any ionic impurities. Moreover, they provide superior results as high impact plastics and as modifiers for the reinforcement of rigid plastics wherein they impart excellent impact strength without substantially detracting from any other physical properties.

In a preferred embodiment of this invention, the SEI particles can be blended or diluted with a conventionally prepared aqueous suspension of polyvinyl chloride or of a copolymer of vinyl chloride together with a minor proportion of one or more of such monomers as vinyl esters including vinyl acetate, vinyl benzoate; vinylidene halides including vinylidene chloride; olefins including ethylene and propylene; alkyl vinyl ethers such as cetyl vinyl ether; ethylenically unsautrated dicarboxylic acids, their anhydrides and their $C_1$–$C_{18}$ mono- and dialkyl esters including maleic and fumaric acids, maleic anhydride, dibutyl fumarate and monoethyl maleate as well as any other ethylenically unsaturated monomers copolymerizable with vinyl chloride. The resulting products are found to have improved physical properties as evidenced by their superior impact strength which is achieved without any substantial reduction in their tensile strength.

In greater detail, now, the sandwich particles which are utilized in preparing the novel SEI particles of this invention are themselves made by means of a procedure whereby a seed emulsion which contains the hard core polymer particles used in preparing these multilayered sandwich particles is first prepared by means of conventional aqueous emulsion procedures well known to those skilled in the art using emulsifiers and water soluble catalysts of the same type as will be described hereinbelow for the seed polymerization step.

Thus, in conducting the seed polymerization step leading to the preparation of the sandwich polymer particles, an aqueous emulsion containing from about 2 to 95%, by weight, of the seed polymer particles which will comprise the hard core of these multilayered particles is admixed with about 5 to 98%, by weight, of a monomer or monomer mixture which will form their outer rubber layer. From about 0.05 to 1.0%, by weight of the monomer mixture, of a water soluble catalyst such, for example, as ammonium, sodium or potassium persulfate, hydrogen peroxide or a redox type such as mixtures of persulfates with alkali metal bisulfites, thiosulfates or hydrosulfites is introduced and the mixture is then heated at a temperature of from about 20 to 100° C. for a period of about 0.25 to 20 hours. The seed polymer emulsion should contain one or more anionic, non-ionic or cationic emulsifiers such, for example, as the alkyl carboxylic acid salts, the alkyl sulfate salts, the alkyl sulfonate salts, the alkyl phosphate salts, the alkyl sulfosuccinate salts, the alkyl aryl ether alcohols and the alkyl aryl polyether sulfate salts.

The latter emulsifiers will, of course, have been present during the polymerization of the seed polymyer emulsion. The concentration of these emulsifiers during the preparation of the seed polymer emulsion as well as in the resulting emulsion is very critical. If there is too much present, new polymer particles will be generated. If there is too little, the emulsion will coagulate. Thus, the surface tension of the seed emulsion, which is a means of expressing the emulsifier concentration, should generally range from about 48 to 60 dynes per square centimeter, depending on the specific emulsion, when measured prior to the polymerization of the outer rubber layer. After the polymerization has been run, an electron micrograph is often made to determine if successful enlargement of the original core latex particles has been obtained. In addition, phase contrast optical microscopy can be used to reveal the two-layered structure of these sandwich particles.

The hard core of these sandwich particles can be any polymer or copolymer having a glass transition temperature (Tg) above room temperature, i.e., above about 25° C., that can be polymerized by free radical emulsion techniques including polyvinyl chloride (PVC), polystyrene (PS), polymethyl methacrylate (PMMA) and the polymethacrylonitrile (PMAN). Also applicable are the copolymers of vinyl chloride, styrene, methyl methacrylate, and methacrylonitrile with each other and with a minor proportion of one or more of such vinyl comonomers as ethyl acrylate, vinyl acetate, acrylonitrile, α-methyl styrene and other common vinyl monomers.

The outer rubber layer of these sandwich particles can be any polymer or copolymer having a Tg less than about 25° C. that can be polymerized by free radical emulsion techniques. The rubber layer should, preferably, be crosslinked so it can retain its size and shape during the polymer processing. This crosslinking can be achieved during the polymerization of the rubber layer if a divinyl or diene crosslinkable comonomer is included in the polymerization recipe, or, where such a crosslinkable comonomer is not present, crosslinking can be achieved subsequent to polymerization.

Examples of rubbers that can be used are the acrylic, isoprene and butadiene rubbers including poly(1,3-butadiene), polyisoprene and polymers of the $C_2$–$C_8$ alkyl acrylates such as poly(butyl acrylate), poly(ethyl acrylate), poly(ethylhexyl acrylate), and poly(n-octyl acrylate) which are preferably crosslinked with small quantities of divinyl monomers such as divinyl benzene or 1,3-butylene dimethacrylate. Also useful are copolymers of 1,3-butadiene, isoprene and the $C_2$–$C_8$ alkyl acrylates with each other and with minor proportions of one or more of such vinyl monomers as styrene; acrylonitrile; vinyl acetate; methyl methacrylate; ethylenically unsaturated carboxylic acids such, for example, as acrylic, methacrylic, itaconic and maleic acids; isoprene; chloroprene; ethylene and other common vinyl monomers.

For purposes of this invention, it is convenient to express the relationship between the core size and the size of the rubber sandwich in terms of the proportion by weight of the core to the total weight, i.e., core+rubber, of the final particle. Thus, the level of percent rubber replaced, by weight, has been found to be from about 0.5 to 97%, i.e., the core may comprise from about 0.5 to 97%, by weight, and preferably 3–50%, by weight, of the sandwich particle. The preferred total amount of rubber in the continuous rubber-rigid polymer blend should be from about 0.5 to 30% of its total weight.

Also required to be admixed with the aqueous emulsion of the sandwich polymer particles is a concentration of from about 0.05 to 2.0%, as based on the total weight of the monomer or monomer mixture which has been added to the sandwich polymer emulsion, of a suspending agent such, for example, as methyl cellulose, hydroxyethyl cellulose, hydroxypropyl cellulose, carboxymethyl cellulose, talc, clay, polyvinyl alcohol, gelatine and the like. In addition, a monomer soluble catalyst or initiator such, for example, as azobisisobutyronitrile, lauroyl peroxide, benzoyl peroxide or isopropylperoxy dicarbonate should be present in a concentration of from about 0.05 to 1.5%, by weight, of the monomer or monomer mixture that has been added to the sandwich polymer emulsion.

Polymerization may then be initiated by heating the above described recipe at a temperature in the range of from about 40 to 80° C. and for a period of from about 3 to 20 hours with agitation being applied throughout the course of the reaction. The resulting product is an aqueous suspension of SEI particles wherein the supernatant fluid is completely devoid of any of the original sandwich polymer emulsion. The total SEI particle solids content of these suspensions will be in the range of from about 3 to 50%, by weight. These SEI particles comprise, in effect, a hard polymeric inner core of an emulsion polymer, a rubber emulsion polymer layer deposited and grafted thereon by means of a seeded emulsion polymerization procedure and a suspension polymer which has been grafted on to so that it surrounds and/or is homogeneously dispersed throughout the mass of said rubber emulsion polymer layer of the original sandwich polymer particle by means of a suspension polymerization procedure. The extent to which this suspension polymer will surround and/or be dispersed within the mass of the rubber emulsion polymer layer will, of course, be determined by the particular monomers which are utilized in the suspension polymerization step as well as the particular polymer which comprises the rubber layer.

Thus, in these SEI particles, the hard inner core of an emulsion polymer may be present in a concentration of from about 0.5 to 48.5%; the rubber emulsion polymer layer may be present in a concentration of from 0.5 to 50%, by weight; said rubber layer having the suspension polymer surrounding and/or homogeneously dispersed therein in a concentration of from about 50 to 99%, by weight, the latter proportions being based on the total weight of the SEI interpolymer particles. A preferred product has been found to contain about 10%, by weight, of the emulsion polymer inner core; about 15% by weight of the rubber emulsion polymer layer; and, about 75% by weight of the suspension polymer surrounding and/or homogeneously dispersed throughout the mass of said rubber emulsion polymer layer.

It is important, with respect to this disclosure, to distinguish between the processes of suspension and emulsion polymerization.

Thus, suspension polymerization refers to a method of polymerization whereby one or more monomers is dispersed in a suspension medium which is a non-solvent for both the monomer and the resulting polymer. Generally water is utilized for this purpose and a monomer soluble polymerization initiator is thereupon introduced. Polymerization takes place within the monomer phase containing the polymerization initiator. The use of the suspending medium assists in the dissipation of the heat of reaction and the polymerization reaction is therefore easier to control. Suspension polymerization is generally accomplished by dispersing the monomer in the suspending medium either by constant agitation or by the use of a suspending agent or both. Various suspending agents are known in the art. These known suspending agents include gelatine, hydroxy methyl cellulose, hydroxy ethyl cellulose, hydroxy propyl cellulose, carboxy methyl cellulose, talc, clay, polyvinyl alcohol and the like.

By contrast, emulsion polymerization involves a process whereby one or more monomers are emulsified in the form of droplets within a continuous phase which should be inert with respect to both the emulsified monomers and the resulting polymer. Water is generally selected as the continuous phase. Emulsification of the monomers is facilitated by the use of one or more emulsification agents which tend to reduce the interfacial tension between the dispersed and continuous phases. Typical emulsifiers include common soaps, salts of long-chain carboxylic and sulfonic acids, alkylated aromatic sulfonic acids and salts of long-chain amines.

A water soluble initiator is employed and it is believed that the polymer chains originate in the continuous, aqueous phase and then continue their growth in the dispersed monomer-polymer phase yielding the polymer product in a finely divided state which remains emulsified within the continuous, aqueous medium. Thus, an important distinction between emulsion and suspension polymerization is that in the former, the monomer is either dispersed into droplets which are stabilized by an adsorbed layer of soap molecules or is solubilized in the soap micelle which is present in aqueous soap solutions. As a result, stable polymer emulsions are readily obtained whereas in a suspension polymerization, the resulting polymer particles are of a relatively larger mass which tend to more readily separate out from the suspension.

The SEI particles resulting from the process of this invention will have a particle size in the range of from about 10 to 300 microns and can, therefore, be readily recovered, as by filtration on a Büchner funnel or similar apparatus, and thereupon simply air dried. There is no need for the use of a costly and time-consuming spray drying or coagulation procedure as is usually required for the isolation, on a large scale commercial basis, of the sandwich polymer particles from which these SEI particles are themselves prepared.

Rigid plastics that can be reinforced by the introduction of the SEI particles of this invention include polyvinyl chloride (PVC), polystyrene (PS), poly(methyl methacrylate) (PMMA), co-poly(styrene-acrylonitrile), polymethacrylonitrile (PMAN), and all the common rigid copolymers of these plastics, e.g., co-poly(vinyl chloride-vinyl acetate), co-poly(methyl methacrylate-ethyl acrylate) and ter-poly(methyl methacrylate - acrylonitrile-styrene). The SEI particles may be dispersed in the rigid plastics by mill blending or by blending them in the form of solid powders, so that the resulting blends will contain from about 0.5 to 30%, by weight, of rubbery material derived from the SEI particles.

The SEI particles of this invention are specially useful as impact additives and may also be used as processing aids for various polymers notably polyvinyl chloride. For instance, when added to polyvinyl chloride at a 2–30% by weight level, as based on the total weight of rubber derived from the SEI particles which is present in the resulting mixture, an increase in the impact strength of the polyvinyl chloride is obtained along with improved processability. As previously indicated, rubber reinforcement of rigid polymers such as polyvinyl chloride or polystyrene has been conventionally accomplished by adding to the plastic, during processing, an additive which consists of a crosslinked rubber particle surrounded by a hard coating. With the novel SEI particles of tihs invention, however, it is possible to obtain improved impact strength in a manner which has distinct advantages as compared to the use of these conventional impact additives. For example, crosslinked rubbers are known to be incompatible with the rigid phase and this can lead to a loss of clarity. The SEI particles, on the other hand, contain less crosslinked rubber material for a given amount of additive which results in a clearer material. There is, additionally, a cost advantage with the SEI particles since the core can be made of a relatively cheaper material.

As noted earlier, a preferred embodiment of the process of this invention relates to the dilution of the SEI particles with such polymers as polyvinyl chloride, polystyrene, poly(methyl methacrylate), polymethacrylonitrile as well as all of the common rigid copolymers containing vinyl chloride, methyl methacrylate and methacrylonitrile. This may be accomplished by diluting or blending the original aqueous suspension in which the SEI particles were polymerized with one or more of the above listed rigid plastics which may be in bulk, solution, suspension or emulsion form; or, it may involve the addition of the dried, isolated SEI particles to a dried suspension of the polymeric diluent. For example, a polyvinyl chloride-SEI blend containing 30% rubber can be mixed in the proportions from about 1:1 to 1:60 with regular, unmodified polyvinyl chloride to yield a product containing 0.5 to 17%, by weight, of rubber derived from the SEI particles. For optimum results, these blends should contain from about 3 to 90%, by weight, of the SEI particles. Products prepared from the latter blends are found to have improved physical properties, particularly with respect to their tensile strength, without any substantial loss in their impact strength.

Thus, by diluting the SEI polymer particles in this manner, it has been found that it is possible to start with SEI particles having a given concentration of rubber which, subsequent to dilution with a polymer such as PVC, will generally yield a product whose impact strength is comparable to the original SEI material despite its reduced overall rubber content while its tensile strength is also ordinarily improved.

The following examples will further illustrate the embodiment of this invention. In these examples, all parts given are by weight unless otherwise noted. In addition, it is to be pointed out that the glass transition temperature of all of the core polymers described in these examples was above 25° C. while that of all of the rubber intermediate layer polymers was less than 25° C.

EXAMPLE I

This example illustrates the preparation of aqueous latices containing sandwich polymer particles having a 0.3 micron polyvinyl chloride core, a crosslinked polybutyl acrylate outer layer, an overall particle size of one micron and wherein 3.5%, by weight, of the outer layer is replaced with the hard, polyvinyl chloride core.

Part 1.—Preparation of the PVC core

Into a 1 quart bottle were placed all of the following ingredients with the exception of the vinyl chloride:

290 gms. deionized water
5 ml. of a 5% aqueous solution of sodium bicarbonate
46 ml. of a 2% aqueous solution of ammonium persulfate
29.2 ml. of a 10% aqueous solution of the sodium salt of 2-ethylhexylsulfate
256 gms. vinyl chloride The bottle was chilled to 0° C. and all of the vinyl chloride was added. The bottle was capped, heated to a temperature of 46° C. and rotated at 18 r.p.m. for six hours.

A polyvinyl chloride emulsion was obtained wherein the polymer particles had a diameter of 0.3 micron.

Part 2.—Growth of the core from 0.3 micron to 0.6 micron with acrylic rubber (A) The following reactants were placed in a 1 quart bottle which was capped, heated to 70° C. and rotated for six hours at 18 r.p.m.:

42 gms. of the polyvinyl chloride latex of Part 1, hereinabove (40% polymer solids)
30 ml. of a 2% aqueous solution of potassium persulfate
120 gms. of butyl acrylate
2.4 gms. of butylene 1,3-dimethacrylate
266 gms. water A latex was obtained having a polymer solids content of 30% and wherein the particles had a diameter of about 0.6 micron.

(B) The procedure of Part 2(A) was repeated with the addition, to the recipe, of 0.55 part of methacrylic acid.

Part 3.—Growth of 0.6 micron latex to 1 micron with acrylic rubber (A) The following reactants were placed in a 1 quart bottle which was capped, heated to 70° C. and rotated at 18 r.p.m. for seven hours:

85 gms. of the polyvinyl chloride-butyl acrylate latex whose preparation was described in Part 2(A) hereinabove (30% polymer solids)
24 ml. of a 2% aqueous solution of potassium persulfate
188 gms. of water
94 gms. of butyl acrylate
1.92 gms. of butylene 1,3-dimethacrylate A latex was obtained having a polymer solids content of 31% and wherein the particles had a diameter of 1 micron.

(B) The procedure of Part 3(A) was repeated using the latex obtained from the process described in Part 2(B). In this case the recipe also contained 0.55 part of methacrylic acid. The resulting latex was then neutralized to a pH of 7-8 by the addition of a 5% aqueous solution of sodium bicarbonate. The thus neutralized latex displayed mechanical, i.e., shear, stability which was superior to that of the latex resulting from the process of Part 3(A).

EXAMPLE II

This example illustrates the preparation of an aqueous latex containing sandwich polymer particles having a 0.7 micron polyvinyl chloride core, a crosslinked polybutyl acrylate outer layer, an overall particle size of 1 micron and wherein 50%, by weight, of the inner particle was replaced with the hard, polyvinyl chloride core. The following reactants were placed in a 1 quart bottle which was heated to 70° C. and thereupon rotated at 18 r.p.m. for three hours:

273 gms. polyvinyl chloride latex having a 0.7 micron particle size and a polymer solids content of 32%
89 gms. butyl acrylate
2 gms. butylene 1,3-dimethacrylate
124 gms. water
23 ml. 2% aqueous solution of potassium persulfate The resulting latex had a polymer solids content of 35.8% and the polymer particles had a diameter of 1 micron.

EXAMPLE III

Part 1

This example illustrates the preparation of the SEI particles of this invention by the suspension polymerization of vinyl chloride in the presence of 10%, by weight, of the sandwich polymer latex whose preparation was described in Example I, hereinabove, which had a polyvinyl chloride core and a crosslinked polybutyl acrylate outer layer. The following reactants were placed in a 1 quart bottle:

196 gms. water
72 gms. 1% aqueous solution of methyl cellulose
0.075 gm. azobisisobutyronitrile
34.5 gms. sandwich polymer emulsion of Part 3(A) of Example I (29% polymer solids)
100 gms. vinyl chloride The bottle was capped, heated to 60° C. and rotated for 10 hours at 40 r.p.m. After cooling, the conversion of vinyl chloride into polyvinyl chloride was found to be 100%.

The product was recovered by being filtered on a Büchner funnel and air dried so as to yield a free-flowing white, granular suspension type material.

Part 2

The procedure of Part 1 was repeated with the use, in this instance, of the neutralized carboxylated copolymer latex resulting from the process of Part 3(B) of Example I. The resulting SEI particles were comparable to those obtained in the process of Part 1 of this example.

EXAMPLE IV

This example illustrates the preparation of the SEI articles of this invention by the suspension polymerization of vinyl chloride in the presence of 20%, by weight of the sandwich polymer latex whose preparation was described in Part 3(A) of Example I, hereinabove, which had a polyvinyl chloride core and a crosslinked polybutyl acrylate outer layer.

The following reactants were placed in a 1 quart bottle:

196 gms. water
72 gms. 1% aqueous solution of methyl cellulose
0.075 gm. azobisisobutyronitrile
69 gms. sandwich polymer latex of Part 3(A) of Example I (29% polymer solids)
100 gms. vinyl chloride The bottle was capped, heated to 60° C. and rotated for 10 hours at 40 r.p.m. The product was recovered by being filtered on a Büchner funnel and air dried so as to yield a free-flowing, white, granular suspension type material.

EXAMPLE V

This example illustrates the preparation of the SEI particles of this invention by the suspension polymerization of vinyl chloride in the presence of 15%, by weight, of the sandwich polymer latex whose preparation was described in Part 3(A) of Example I, hereinabove, which had a polyvinyl chloride core and a crosslinked polybutyl acrylate outer layer.

The following reactants were placed in a 1 quart bottle:

196 gms. water
72 gms. 1% aqueous solution of methyl cellulose
0.075 gm. azobisisobutyronitrile
52 gms. sandwich polymer emulsion of Part 3(A) of Example I (29% polymer solids)
100 gms. vinyl chloride The bottle was capped, heated to 60° C. and rotated for 8 hours at 40 r.p.m. The product was recovered by being filtered on a Büchner funnel and air dried so as to yield a free-flowing, white, granular suspension type material. The particle size distribution of the dried product was then analyzed with an Allen-Bradley sonic sifter. The following table describes the results of this analysis:

| U.S. Standard screen No.— | Percent by weight particles retained |
|---|---|
| 40 | 23 |
| 60 | 12 |
| 80 | 10 |
| 100 | 8 |
| 140 | 20 |
| 200 | 15 |
| Pan | 12 |

EXAMPLE VI

This example illustrates the preparation of the SEI particles of this invention by the suspension polymerization of vinyl chloride in the presence of 15%, by weight, of the sandwich polymer latex whose preparation was described in Example II, hereinabove, which had a polyvinyl chloride core and a crosslinked polybutyl acrylate outer layer.

The following reactants were placed in a 1 quart bottle:

196 gms. water
72 gms. 1% aqueous solution of methyl cellulose
0.075 gm. azobisisobutyronitrile
43 gms. 50% polymer latex of Example II (35.8% solids)
100 gms. vinyl chloride The bottle was capped, heated to 60° C. and rotated 8 hours at 40 r.p.m. The product was recovered by being filtered on a Büchner funnel and air dried so as to yield a free-flowing, white, granular suspension type material.

EXAMPLE VII

This example illustrates the excellent results obtained when the SEI products whose preparation is described in Examples III–VI, hereinabove, were utilized as impact additives and processing aids for polyvinyl chloride.

In evaluating these SEI products, they were either milled alone or first diluted with the indicated amount of a commercially available polyvinyl chloride resin. In either case, the milling was conducted on a two-roll mil operating at 350–360° F. for a period of three minutes. As stabiizers, each sample contained 3 p.h.r. of a tin mercaptide stabilizer sold as Thermolite 31 by M & T Chemicals, Inc. and 0.5 p.h.r. of calcium stearate. The following table describes the composition of the various samples which were evaluated as well as the results obtained.

| Product of Example No. | Percent sample used | Percent PVC[1] for dilution | Final rubber concentration | Tensile strength p.s.i.[2] | Tensile impact[3] strength, ft. lbs./in.[2] |
|---|---|---|---|---|---|
| PVC control | | | 0 | 7,800 | 75 |
| 3 | 100 | 0 | 10 | 4,500 | 195 |
| 4 | 50 | 50 | 10 | 5,200 | 286 |
| 4 | 25 | 75 | 5 | 6,400 | 144 |
| 5 | 100 | 0 | 15 | 4,300 | 176 |
| 5 | 33 | 66 | 5 | 6,300 | 178 |
| 6 | 100 | 0 | 7.5 | 5,000 | 186 |
| A MBS commercial impact additive[4] | 10 | 90 | ([5]) | 6,800 | 117 |

[1] Polyvinyl chloride Mn 44,000; M.W. 86,000; Rv 2.11 at 1 gm./dec. in cyclohexanone at 30° C.
[2] Modified ASTM D–1708 procedure, length of flat section 0.5" instead of 0.876"; effective speed B.
[3] ASTM procedure D–1822, Type L specimen.
[4] A methyl methacrylate:acrylonitrile:butadiene:styrene interpolymer sold as "Kane Ace B–12" by the Kanegafuchi Chemical Company.
[5] Not available.

EXAMPLE VIII

This example illustrates the excellent results obtained when the SEI product whose preparation is described in Example V, hereinabove, was formulated with polyvinyl chloride and the resulting blend thereupon subjected to an extrusion procedure.

The SEI product from Example V was included in the following formulation:

66 parts of the commercially available polyvinyl chloride described in Example VII, hereinabove
33 parts of the SEI product of Example V
3 parts of Thermolite T–31
2 parts of an acrylic processing aid comprising a methyl methylacrylate:ethyl acrylate copolymer sold as K–120 N (Rohm and Haas)
1 parts of a wax lubricant sold as Wax E (Hoechst)

This formulation was extruded through a one inch diameter Modern Plastics Machinery extruder using a 2.76:1 compression screw with a 12 inch sheet dye to produce a film having a thickness of 15 mils. Tensile strength and impact were measured by the same ASTM procedures referred to in Example VII. Elongation and elastic modulus were measured by ASTM Procedure D–882. These results are presented below.

| Sample | Parts experimental resin | Melt Temp., °F. | Pressure | Tensile strength, p.s.i. | Percent elongation | Elastic modulus ×10⁵ sq. in. | Tensile impact, ft. lbs./in.² |
|---|---|---|---|---|---|---|---|
| PVC control | 0 | 380 | 3,300 | 8,234 | 200 | 1.82 | 32.4 |
| Example V | 33 | 375 | 4,600 | 6,351 | 180 | 1.51 | 56.5 |
| Kane Ace B–12 | 15 | 375 | 4,500 | 7,709 | 199 | 1.83 | 44.1 |

Comparable results were obtained when a styrene: acrylonitrile (75:25) copolymer and polymethyl methacrylate were each, in turn, substituted for the polyvinyl chloride in the above described procedure.

EXAMPLE IX

This example illustrates the preparation and evaluation of SEI particles which contained 20%, by weight, of the sandwich polymer whose preparation is described in Part 3(A) of Example I.

The following reactants were placed in a 1 quart bottle which was capped and heated at 70° C. for 10 hours while being rotated at 40 r.p.m.

78 gms. of the latex from Example I, Part 3(A) having a PVC core and a crosslinked polybutyl acrylate outer layer (29% polymer solids)
225 gms. water
75 gms. 1%, by weight, aqueous solution of methyl cellulose
0.2 gm. azobisisobutyronitrile
75 gms. styrene
25 gms. acrylonitrile
0.25 gm. tertiary dodecyl mercaptan A free flowing powdery product was obtained which was filtered on a Büchner funnel and air dried. As a stabilizer, 0.25% butylated hydroxy toluene was then added and the resulting product was milled for 7 minutes on a two-roll mill operating with the back roll at 250° F. and the front roll at 325° F. The following table presents the results of various evaluation tests which were conducted on samples of the milled product.

| Sample | Percent sample used | Final rubber concentration | Tensile [2] impact strength, ft. lbs./in. |
|---|---|---|---|
| Control [1] | 100 | 0 | 5.3 |
| The above described product | 100 | 19.4 | 9.1 |

[1] A co-poly(styrene-acrylonitrile) copolymer sold as "Tyril 676" by The Dow Chemical Company.
[2] ASTM Procedure D-1822 using a Type L specimen.

Variations may be made in proportions, procedures and materials without departing from the scope of this invention as defined in the following claims.

What is claimed is:

1. A composition comprising an intimate, physical admixture of a rigid plastic selected from the group consisting of polyvinyl chloride, polystyrene, polymethacrylonitrile, polymethyl methacrylate, co-poly(styrene-acrylonitrile), co-poly(vinyl chloride-vinyl acetate), ter-poly-(methyl methacrylate-acrylonitrile-styrene) and co-poly-(methyl methacrylate-ethyl acrylate) and mixtures thereof, and rubber-containing interpolymer particles having an inner core of an emulsion polymer having a glass transition temperature above about 25° C.; a layer of a rubber emulsion polymer surrounding said inner core and having a glass transition temperature less than about 25° C.; and, a suspension polymer surrounding and/or homogeneously dispersed within the mass of said rubber emulsion polymer; wherein said emulsion polymer core is derived from at least one monomer selected from the group consisting of vinyl chloride and mixtures of vinyl chloride with a minor proportion of at least one other vinyl monomer; wherein the rubber emulsion polymer layer of said particles is derived from at least one monomer selected from the group consisting of 1,3-butadiene, isoprene and the $C_2$–$C_8$ alkyl acrylates and mixtures of the latter monomers with each other and with a minor proportion of at least one other vinyl monomer; and wherein said suspension polymer is derived from at least one monomer selected from the group consisting of vinyl chloride and mixtures of vinyl chloride with a minor proportion of at least one other vinyl monomer.

2. The composition of claim 1, wherein the emulsion polymer core of said particles comprises from about 0.5% to about 48.5%, by weight; said rubber emulsion polymer layer comprises from about 0.5 to about 50%, by weight, and, said suspension polymer comprises from about 50 to 99%, by weight; all of the latter proportions being based on the total weight of said individual particles.

3. The composition of claim 1, wherein said emulsion polymer core is polyvinyl chloride.

4. The composition of claim 1, wherein said rubber emulsion polymer layer of said particles is crosslinked polybutyl acrylate.

5. The composition of claim 1, wherein said other vinyl monomer of the rubber emulsion polymer layer of said particles is an ethylenically unsaturated carboxylic acid.

6. The composition of claim 5, wherein said other vinyl monomer of the rubber emulsion polymer layer of said particles is methacrylic acid.

7. The composition of claim 1, wherein said rubber emulsion polymer layer of said particles is a crosslinked copolymer of butyl acrylate and an ethylenically unsaturated carboxylic acid.

8. The composition of claim 7, wherein said rubber emulsion polymer layer of said particles is a crosslinked copolymer of butyl acrylate and methacrylic acid.

9. The composition of claim 1, wherein said suspension polymer is polyvinyl chloride.

10. The composition of claim 1, wherein said rigid plastic is polyvinyl chloride.

11. The composition of claim 1, wherein said particles are present in a concentration such that said composition has a total rubber content derived from said particles of from about 0.5 to 30%, as based on the total weight of said composition.

12. A composition comprising an intimate admixture of rigid polyvinyl chloride and rubber-containing interpolymer particles having an inner core, of a polyvinyl chloride emulsion polymer; a layer of a crosslinked butyl acrylate emulsion polymer surrounding said inner core; and a polyvinyl chloride suspension polymer surrounding and/or homogeneously dispersed within the mass of said crosslinked butyl acrylate polymer.

13. The method of improving the impact strength of rigid plastics selected from the group consisting of polyvinyl chloride, polystyrene, polymethacrylonitrile, polymethyl methacrylate, co-poly(styrene-acrylonitrile), co-poly(vinyl chloride-vinyl acetate), ter-poly(methyl methacrylate-acrylonitrile-styrene) and co-poly(methyl methacrylate-ethyl acrylate) and mixtures thereof which comprises the intimate, physical admixture therewith of a plurality of rubber-containing interpolymer particles comprising an inner core of an emulsion polymer having a glass transition temperature above about 25° C.; a layer of a rubber emulsion polymer surrounding said inner core, said rubber emulsion polymer having a glass transition temperature less than about 25° C. and in any event below that of the inner core; and, a suspension polymer which surrounds and/or is homogeneously dispersed within the mass of said rubber emulsion polymer layer; wherein the emulsion polymer core of said particles is derived from at least one monomer selected from the group consisting of vinyl chloride and mixtures of vinyl chloride with a minor proportion of at least one other vinyl monomer; wherein the rubber emulsion polymer layer of said particles is derived from at least one monomer selected from the group consisting of 1,3-butadiene, isoprene and the $C_2$–$C_8$ alkyl acrylates and mixtures of the latter monomers with each other and with a minor proportion of at least one other vinyl monomer; wherein the suspension polymer of said particles is derived from at least one monomer selected from the group consisting of vinyl chloride and mixtures of vinyl chloride with a minor proportion of at least one other vinyl monomer.

14. The method of claim 13, wherein the emulsion polymer core of said particles comprises from about 0.5% to about 48.5%, by weight; said rubber emulsion polymer layer comprises from about 0.5% to about 50%, by weight; and said suspension polymer comprises from about 50 to 99%, by weight; all of the latter proportions being based on the total weight of said individual particles.

15. The method of claim 13, wherein the emulsion polymer core of said particles is polyvinyl chloride.

16. The method of claim 13, wherein said rubber emulsion polymer layer of said particles is crosslinked polybutyl acrylate.

17. The method of claim 13, wherein said other vinyl monomer of the rubber emulsion polymer layer of said particles is an ethylenically unsaturated carboxylic acid.

18. The method of claim 17, wherein said other vinyl monomer of the rubber emulsion polymer layer of said particles is methacrylic acid.

19. The method of claim 13, wherein said rubber emulsion polymer layer of said particles is a crosslinked copolymer of butyl acrylate and an ethylenically unsaturated carboxylic acid.

20. The method of claim 19, wherein said rubber emulsion polymer layer of said particles is a crosslinked copolymer of butyl acrylate and methacrylic acid.

21. The method of claim 13, wherein said suspension polymer of said particles is polyvinyl chloride.

22. The method of improving the impact strength of rigid plastics selected from the group consisting of polyvinyl chloride, polystyrene, polymethacrylonitrile, polymethyl methacrylate, co-poly(styrene-acrylonitrile), co-poly(vinyl chloride-vinyl acetate), ter-poly(methyl methacrylate-acrylonitrile-styrene) and co-poly(methyl methacrylate-ethyl acrylate) and mixtures thereof which comprises the intimate admixture therewith of a plurality of rubber-containing interpolymer particles comprising an inner core of polyvinyl chloride emulsion polymer; a layer of a crosslinked butyl acrylate emulsion polymer surrounding said inner core; and, a polyvinyl chloride suspension polymer surrounding and/or homogeneously dispersed within the mass of said crosslinked butyl acrylate polymer.

23. A composition comprising an intimate physical admixture of a rigid plastic selected from the group consisting of polyvinyl chloride, polystyrene, polymethacrylonitrile, polymethyl methacrylate, co-poly(styrene-acrylonitrile), co-poly(vinyl chloride-vinyl acetate), ter-poly(methyl methacrylate-acrylonitrile-styrene) and co-poly(methyl methacrylate-ethyl acrylate) and mixtures thereof, and a plurality of rubber-containing interpolymer particles comprising an inner core of polyvinyl chloride emulsion polymer; a layer of a crosslinked butyl acrylate emulsion polymer surrounding said inner core; and, a polyvinyl chloride suspension polymer surrounding and/or homogeneously dispersed within the mass of said crosslinked butyl acrylate polymer.

24. The method of improving the impact enough of vinyl chloride polymers which comprises the intimate admixture therewith of a plurality of rubber-containing interpolymer particles comprising an inner core of polyvinyl chloride emulsion polymer; a layer of a crosslinked butyl acrylate emulsion polymer surrounding said inner core; and, a polyvinyl chloride suspension polymer surrounding and/or homogeneously dispersed within the mass of said crosslinked butyl acrylate polymer.

25. A composition comprising an intimate physical admixture of a vinyl chloride polymer and a plurality of rubber-containing interpolymer particles comprising an inner core of a polyvinyl chloride emulsion polymer; a layer of a crosslinked butyl acrylate emulsion polymer surrounding said inner core; and, a polyvinyl chloride suspension polymer surrounding and/or homogeneously dispersed within the mass of said crosslinked butyl acrylate polymer.

References Cited

UNITED STATES PATENTS

| | | | |
|---|---|---|---|
| 3,458,603 | 7/1969 | Griffin | 260—881 |
| 3,370,105 | 2/1968 | De Bell et al. | 260—880 |
| 3,448,173 | 6/1969 | Ryan et al. | 260—876 |
| 3,290,265 | 12/1966 | Kaneko | 260—29.6 |
| 3,509,238 | 4/1970 | Aubrey et al. | 260—876 |

FOREIGN PATENTS

| | | | |
|---|---|---|---|
| 1,051,145 | 12/1966 | Great Britain | 260—876 |
| 932,852 | 7/1963 | Great Britain | 260—876 |

SAMUEL H. BLECH, Primary Examiner

J. SEIBERT, Assistant Examiner

U.S. Cl. X.R.

260—17 A, 29.6 RB, 29.7 R, 33.4 R, 879, 881, 884, 885

UNITED STATES PATENT OFFICE
CERTIFICATE OF CORRECTION

Patent No. 3,660,529  Dated May 2, 1972

Inventor(s) FRANK O. GROCH

It is certified that error appears in the above-identified patent and that said Letters Patent are hereby corrected as shown below:

Column 1, line 47, the word "comprise" should read --compromise--
Column 3, line 52, the word "polymyer" should read --polymer--.
Column 6, line 32, the word "tihs" should read --this--.
Column 8, EXAMPLE IV, line 56, the word "articles" should read
        --particles--.
Column 10, EXAMPLE VII, last column, the word "impac$^3$" should
        read --impact$^3$--; EXAMPLE VIII, line 59, the word
        "parts" should read --part--.
Column 15, Claim 24, line 9, the word "enough" should read
        --strength--.

Signed and sealed this 19th day of September 1972.

(SEAL)
Attest:

EDWARD M. FLETCHER, JR.                ROBERT GOTTSCHALK
Attesting Officer                      Commissioner of Patents